United States Patent [19]

Abt

[11] Patent Number: 4,805,022
[45] Date of Patent: Feb. 14, 1989

[54] DIGITAL WIPE GENERATOR

[75] Inventor: John Abt, Nevada City, Calif.

[73] Assignee: The Grass Valley Group, Inc., Grass Valley, Calif.

[21] Appl. No.: 158,827

[22] Filed: Feb. 19, 1988

[51] Int. Cl.$^4$ .............................................. H04N 5/272
[52] U.S. Cl. .................................... 358/183; 358/182
[58] Field of Search .................. 358/183, 182, 22, 185

[56] References Cited

U.S. PATENT DOCUMENTS

| Re. 29,600 | 3/1978 | Tkacenko | 358/183 |
|---|---|---|---|
| 3,371,160 | 2/1968 | Hurford | 358/182 X |
| 3,944,731 | 3/1976 | Busch | 358/183 |
| 3,962,536 | 6/1976 | Busch | 358/183 |
| 4,041,527 | 8/1977 | Rayner et al. | 358/22 |
| 4,121,253 | 10/1978 | McCoy | 358/183 X |
| 4,319,266 | 3/1982 | Bannister | 358/22 |
| 4,395,733 | 7/1983 | Elenbaas | 358/183 |
| 4,520,398 | 5/1985 | Takahashi | 358/22 X |
| 4,694,343 | 9/1987 | Flora | 358/22 X |

FOREIGN PATENT DOCUMENTS 2919157 12/1979 Fed. Rep. of Germany ...... 358/183
57-38072 3/1982 Japan .................... 358/183
60-43975 3/1985 Japan .................... 358/183

Primary Examiner—James J. Groody
Assistant Examiner—E. Anne Faris
Attorney, Agent, or Firm—Francis I. Gray

[57] ABSTRACT

A digital wipe generator has a digital waveform generator to generate X and Y digital waveforms from a composite sync signal. A digital wipe solid generator processes the X and Y digital waveforms to produce a digital wipe solid waveform. The wipe solid generator has a circle generator using a square root function which preshifts the sum of the squares prior to access to a look-up table, and then post shifts the output of the look-up table by one-half the amount of the preshift to produce a desired curve pattern for the digital wipe solid waveform. The digital wipe solid waveform is input to mixer circuits where it is processed to produce an anti-aliased key signal for mixing external video signals, the anti-aliasing being based upon an interpolation/decimation scheme using fractional bits of the digital wipe solid waveform. The output of the mixer circuits is a desired wipe transition.

5 Claims, 4 Drawing Sheets

DIGITAL WIPE GENERATOR

BACKGROUND OF THE INVENTION

The present invention relates to wipe generators, and more particularly to a digital wipe generator having anti-aliasing to maintain sub-pixel resolution and having improved circle generation capability.

In the video broadcast arts a wipe is a transition, normally accomplished in a video production switcher, between two video sources that follows a selected geometric pattern. A wipe generator creates the selected geometric pattern by deriving a waveform that then controls video mixers in video switching circuits. Traditional wipe generators, such as that shown in FIG. 1, have a waveform generator section, a solid generator section, a matrix generator section and a clip and gain section. The waveform generator section has horizontal (H) and vertical (V) counters, a rotation multiplier matrix, and absolute value circuits that produce waveforms X and Y. The X and Y waveforms are typically ramp and/or triangle waveforms that can be inverted and/or rotated. The solid generator section contains arithmetic circuits that combine the X and/or Y waveforms in various ways to produce a third waveform WS called a "solid". The clip and gain section performs a traditional operation upon the solid to produce the wipe waveform where the clip point pertains to the spatial position of the wipe transition and the gain pertains to the softness of the wipe transition. The matrix section produces "matrix" wipes that are a look-up table derived wipe waveform, the look-up table being addressed by the X and Y waveforms.

Current wipe generators are generally of analog architecture. However a digital wipe generator is required for use with a digital switcher. The straight forward approach would be to take the output of the analog wipe generator and digitize the analog signals with appropriate analog to digital (A/D) converters. This approach results in noise caused distortions, i.e., circle patterns lose their shape when made small. Another approach is to take the analog architecture and convert directly to a digital design. Current attempts at a digital architecture have resulted in severe aliasing problems, i.e., the edges of lines that are not exactly horizontal or vertical demonstrate a staircase effect commonly called "jaggies".

What is desired is an anti-aliased digital wipe generator that maintains sub-pixel resolution and constant shape wipe patterns at all sizes.

SUMMARY OF THE INVENTION

Accordingly the present invention provides a digital wipe generator having anti-aliasing and having constant wipe pattern shapes. A waveform generator provides X and Y waveforms from an input sync signal, the waveforms being determined by operator input to a microprocessor. The X and Y waveforms are combined in a wipe solid generator to produce a wipe solid (WS) waveform which is subsequently used to mix various video signals to produce a desired video signal output. For wipe patterns involving curves a square root operation is required. The X and Y waveforms are squared, summed and then preshifted so that only a predetermined number of the most significant bits of the result of the mathematical operation is used to address a look-up table. The result obtained from the look-up table is then post-shifted by one-half the amount of the preshift to obtain the final output.

The objects, advantages and other novel features of the present invention are apparent from the following detailed description when read in conjunction with the appended claims and attached drawing.

DESCRIPTION OF THE PREFERRED EMBODIMENT

Figure 1:
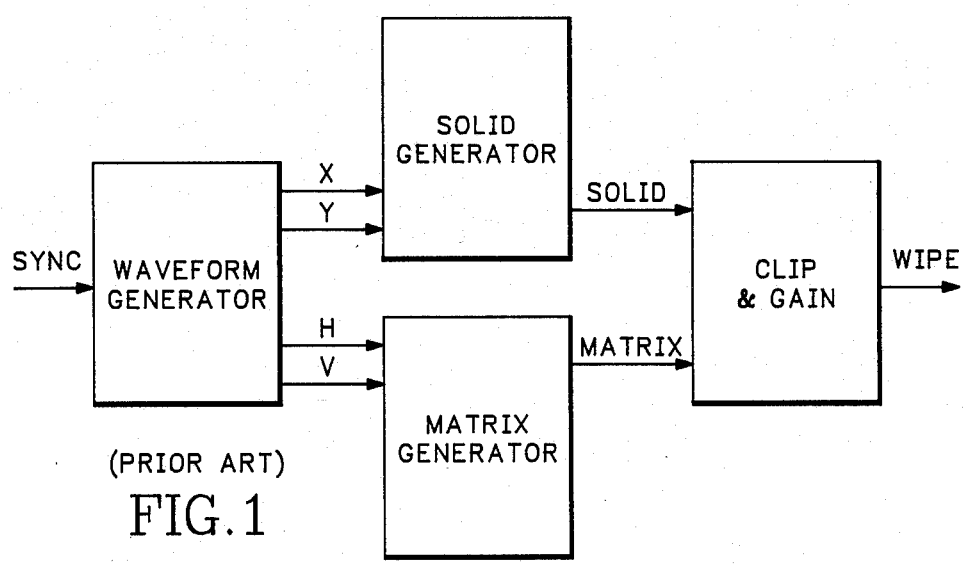
FIG. 1 is a block diagram for a traditional prior art analog wipe generator.
Figure 2:
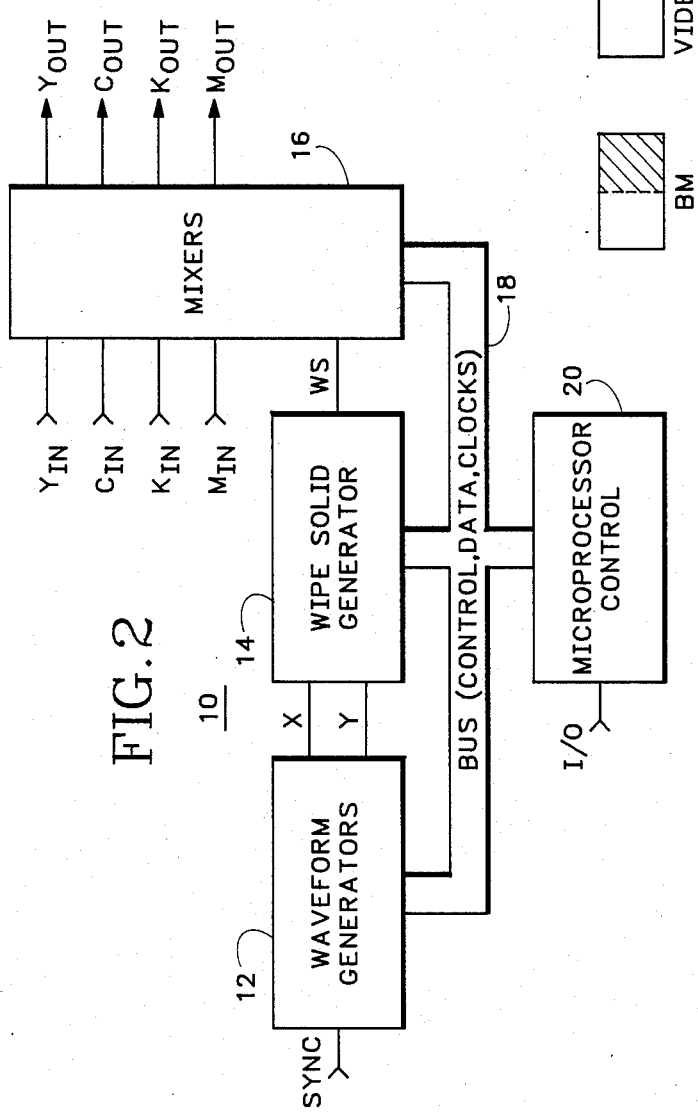
FIG. 2 is a block diagram for a digital wipe generator according to the present invention.

Referring now to FIG. 2 a digital wipe generator 10 is shown having a basic architecture similar to the prior art analog wipe generators as shown in FIG. 1. A waveform generator 12 receives a composite video sync input and produces X and Y output digital waveforms, in the digital form S10.5 for a 16-bit word where S is the sign bit and the last five bits are the fractional portion, using conventional H and V counters together with sine and cosine function generators, associated multipliers for rotation and adders for position adjustment. The X and Y waveforms are input to a digital wipe solid generator 14 to produce a wipe solid (WS) output digital waveform. The WS waveform is input to a mixer circuit 16 to which also is input other digital input signals, such as luminance (YIN), chrominance (CIN), key (KIN) and mask (MIN) signals. The mixer circuit 16 combines the input signals according to the WS waveform to produce corresponding desired output signals, such as luminance (YOUT), chrominance (COUT), key (KOUT) and mask (MOUT) signals. The waveform generator 12, wipe solid generator 14 and mixer circuit 16 are connected together by a bus 18 to which also is connected a microprocessor 20. The microprocessor 20 provides appropriate control waveforms, data and clock signals to the various modules connected to the bus 18 according to inputs received via an input/output (I/O) port.

Figure 3:
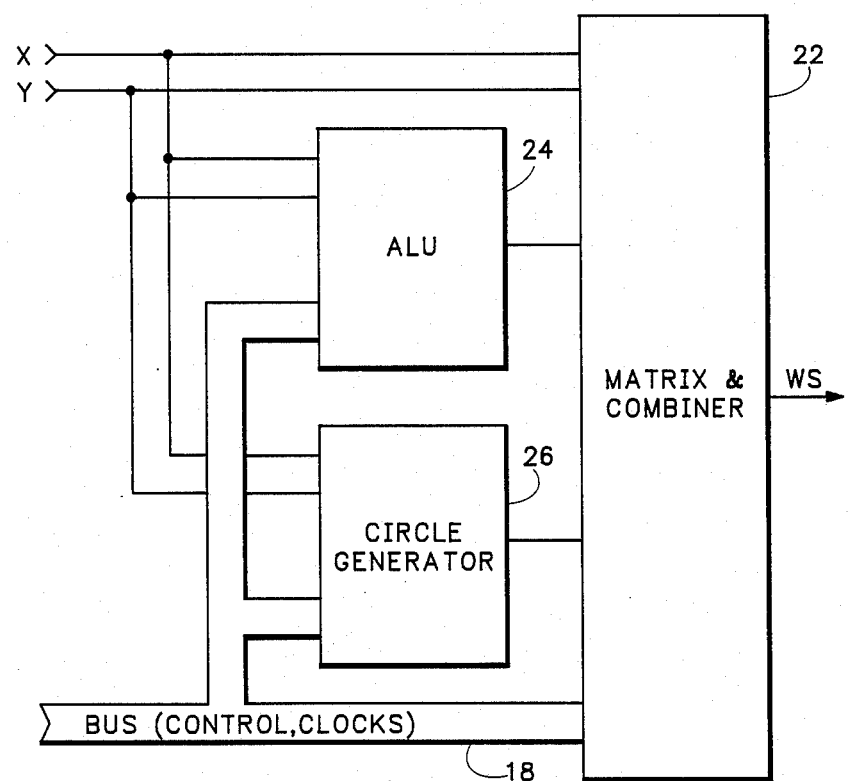
FIG. 3 is a block diagram for a digital wipe solid generator used in the digital wipe generator according to the present invention.

The wipe solid generator 14 is shown in greater detail in FIG. 3. The X and Y waveforms are input respectively to a matrix/combiner circuit 22, an arithmetic logic unit (ALU) 24 and a circle generator 26. Under control of various control waveforms and clocks from the bus 18 the ALU 24 and circle generator 26 perform appropriate manipulations upon the X and Y waveforms, the results of which are input to the matrix/combiner circuit 2 to produce the desired wipe pattern waveform WS where WS=F(X,Y), all under control of the microprocessor 20 via the bus. As shown in FIG. 1 traditionally matrix PROMs for matrix wipes have been driven by the H and V counters in the waveform generator 12. However in the digital wipe generator 10 all waveforms are digital and any of them can drive the matrix PROMs of the matrix/combiner circuit 22. Using the X and Y waveforms allows rotate/aspect ratio type manipulations of matrix patterns.

Figure 4:
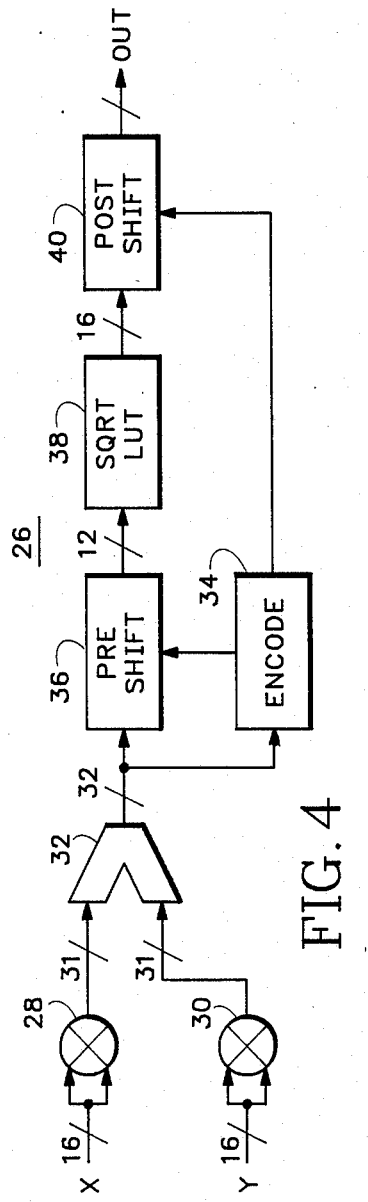
FIG. 4 is a block diagram for a square root circuit used in the digital wipe solid generator according to the present invention.

The circle generator 26 as shown in FIG. 4 performs the basic arithmetic function $$OUT = sqrt(X^2 + Y^2)$$

to produce a desired curved output. The X and Y waveforms are input to respective multipliers 28, 30. The resulting products from the multipliers 28, 30 are input to an adder 32 to sum the products. The output of the adder 32 is input to an encoder 34 and a preshifter 36. The encoder 34 detects the number of leading zeros in the output from the combiner 32 to generate appropriate shift commands for the preshifter 36 to normalize the output by shifting up. The output of the preshifter 36, which is the most significant bits after the leading zeros of the combiner output, serves as an address to a square root look-up table 38. The output of the square root look-up table 38 is input to a post-shifter 40 to compensate for the pre-shift by shifting down, the amount of the shift being determined by the encoder 34 as one-half of that for the preshifter 36. The output of the post-shifter 40 is the desired curve output which is then input to the matrix/combiner circuit 22 of the wipe solid generator 14. For ease of implementation the pre-shift command is constrained to be an even integer number so that the post-shift command is an integer number.

Figure 6:
FIG. 6 is a representation of the various signals corresponding to the mixers of FIG. 5.
Figure 5:
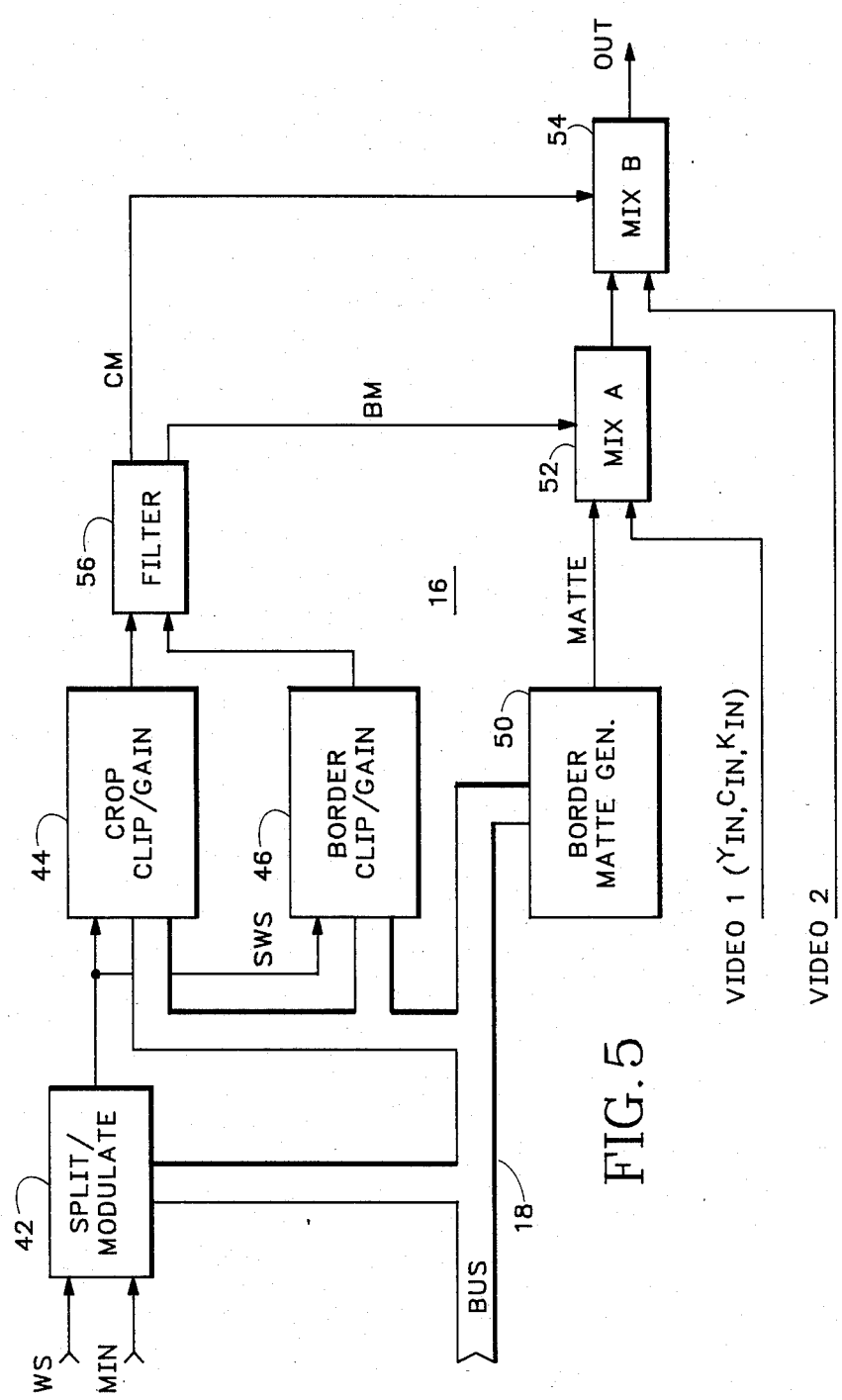
FIG. 5 is a block diagram for mixers used in the digital wipe generator according to the present invention.

The WS waveform from the wipe solid generator 14 is input to a split/modulate circuit 42 as shown in FIG. 5 which produces a mirror image pattern, if desired, and/or takes an outside signal source MIN to add to the WS waveform after a gain multiply determined by data on the bus 18 to output a split wipe solid (SWS) waveform. The SWS waveform from the split/modulate circuit 42 is input to a plurality of clip and gain circuits 44, 46 to produce a key signal to drive various mixing circuits 52, 54 which actually perform the video transitions. A digital clip and gain circuit suitable for the present application is described in U.S. Pat. No. 4,771,192 issued Sept. 13, 1988 to Richard A. Jackson entitled "Digital Clip and Gain Circuit". Since some functions of the wipe solid generator 14 produce WS waveforms that can step abruptly from zero to one in a single sample period which violates the Nyquist criteria and produces jaggies, a filter circuit 56 is inserted between the crop and border clip and gain circuits 44, 46 and the mixer circuits 52, 54. The filter circuit 56 may be a simple four-point two-dimensional filter and insures that the key signals which are input to the mixer circuits 52, 54 are always in-band, allowing for rotation of matrix patterns which have step edges. A border matte generator 50 is controlled via the control bus 18 to generate a suitable border for mixing with the first video (VIDEO 1) which has the YIN, CIN and KIN components. As illustrated in FIG. 6 the filtered output from the border clip/gain circuit 46 (BM) is input to the first mixer 52 to provide a mix between the first video and the matte. The filtered output from the crop clip/gain circuit 44 is input to the second mixer 54 to provide a mix between a second video (VIDEO 2) and the output of the first mixer 52 to produce the video output signal (OUT). As shown the OUT signal represents a wipe between VIDEO 1 and VIDEO 2 with a border MATTE between.

Since the clip and gain circuits 44, 46 operate with, for example, sixteen bit resolution, and the input wipe pattern SWS is in the form of a number having a certain number of fractional bits, sub-pixel resolution may be attained. This is equivalent to a signal that has been interpolated up to a sampling rate $2^n$ times the original sampling rate, where n equals the number of fractional bits. The key signal is than obtained by decimating back down to the original rate. For example:

| Line 1: | 0 | | | | .5 | | | | 1 |
|---|---|---|---|---|---|---|---|---|---|
| Line 1': | 0 | 0 | 0 | .25 | .5 | .75 | 1 | 1 | 1 |
| Line 2: | 0 | | | | .25 | | | | 1 |
| Line 2': | 0 | 0 | 0 | 0 | .25 | .5 | .75 | 1 | 1 |

Lines 1 and 2 represent the sampling points of a key (and video) signal. Lines 1' and 2' represent zero to one transition at a sampling rate four times that of the video, i.e., two bits fractional resolution. As the transition moves to the right, going from lines 1 to 2, the video version makes a smooth interpolation and retains the actual position. Since the output is needed at the video sample times only, the other points are not computed and the hardware does not need to run at the higher rate. This results in an anti-aliased digital wipe.

The difference between source and target repeats becomes evident when the wipe patterns are rotated. Target repeats are defined to be wipe patterns where each individual member of the repeated pattern rotates about it's own center. Source repeats rotate the entire repeated wipe pattern about the center as defined by the operator. Repeats are accomplished by multiplying up the X and Y ramp/triangle waveforms in the waveform generator 12 and truncating the most significant bit to produce multiple ramp/triangle waveforms. Target repeats perform this operation before the rotation matrix while source repeats do it after the rotation matrix.

Aspect ratio is implemented by introducing gain factors into the rotation matrix multiply in the waveform generator 12. The manner in which these factors are introduced determines if aspect ratio is source or target. If aspect ratio is target, the rotated pattern does not change shape. If aspect ratio is source, then the shape of the wipe pattern changes as it is rotated.

Figure 7:
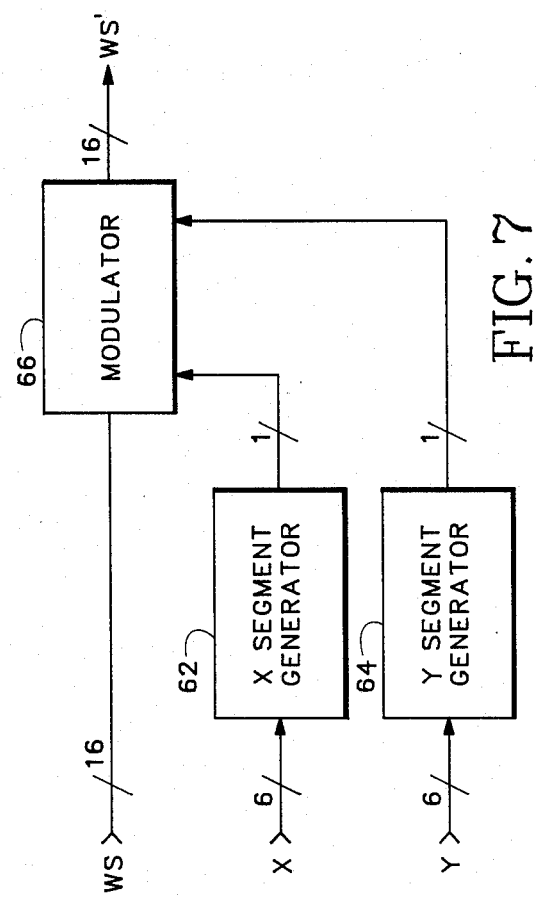
FIG. 7 is a block diagram for a segment generator used in the digital wipe solid generator according to the present invention.

Finally segmented wipe patterns are a two pass wipe where in the first pass, or first half of a transition, a normal wipe occurs only in defined "segments." The second pass, or second half of the transition, wipes the segments that were unmodified in the first pass, thus completing the wipe. The segments are slices of equal and adjustable size which can be driven by the X or Y waveforms. Segmentation is a modifier that can be applied to any wipe pattern. As shown in FIG. 7 the X and Y segment generators 62, 64 derive a one bit waveform from the appropriate least significant bits of the X and Y waveforms under control of the microprocessor 20. A modulator 66, under control of the segmented waveforms from the segment generators 62, 64, forces the solid waveform to either it's maximum or minimum value. For example in the first pass wherever a selected segment waveform is "1", the wipe solid waveform is forced to maximum which inhibits the wipe from occurring in those areas. During the second pass wherever the segment waveform is "0", the wipe solid waveform is forced to its minimum value which retains the "wiped" condition attained previously while the normal wipe occurs in the remaining areas. The modulator 66 "ANDs" the segment waveforms to make them useable simultaneously.

Thus the present invention provides a digital wipe generator with an improved circle pattern generation capability and an anti-aliased output due to the use of fractional bits in the digital words and the use of shifting to use a lesser bit look-up table for a square root function as well as providing other unique wipe effects.

What is claimed is:

1. A digital wipe generator comprising:
    means for generating from timing signals digital waveforms;
    means for performing arithmetical operations on the digital waveforms;
    means for generating a desired curve pattern from the digital waveforms;
    means for matrixing and combining the digital waveforms with the outputs of the performing means and the desired curve pattern generating means to produce a digital wipe solid waveform representing a desired wipe pattern; and
    means for combining the digital wipe solid waveform with external signals to produce a desired wipe transition.

2. A digital wipe generator as recited in claim 1 wherein the desired curve pattern generating means comprises:
    means for calculating an intermediate output representing the sum of the squares of the digital waveforms;
    means for normalizing the intermediate output to obtain an addressed pointer which uses only a predetermined number of the most significant bits after leading zeros of the intermediate output;
    means for producing a square root output representing the square root of the intermediate output using the address pointer; and
    means for shifting the square root output to produce the desired curve pattern.

3. A digital wipe generator as recited in claim 1 wherein the combining means comprises:
    means for splitting and modulating the digital wipe solid waveform to produce a split waveform signal;
    means for clipping and amplifying the split waveform signal to produce an anti-aliased key signal; and
    means for mixing external signals with the anti-aliased key signal to produce the desired wipe transition.

4. A digital wipe generator as recited in claim 3 wherein the combining means further comprises means for filtering the anti-aliased key signal from the clipping an amplifying means to produce a filtered anti-aliased key signal for input to the mixing means to produce the desired wipe transition.

5. A digital wipe generator as recited in claim 3 wherein the clipping and amplifying means comprises:
    means for interpolating the split waveform signal by using fractional bits of the split waveform signal; and
    means for decimating the interpolated split waveform signal to produce the anti-aliased key signal.

* * * * *